United States Patent [19]

Sigler

[11] 4,136,926

[45] Jan. 30, 1979

[54] ACHROMATIC ILLUMINATION SYSTEM FOR SMALL TARGETS

[75] Inventor: Robert D. Sigler, Ann Arbor, Mich.

[73] Assignee: The United States of America as represented by the United States Department of Energy, Washington, D.C.

[21] Appl. No.: 896,540

[22] Filed: Apr. 14, 1978

[51] Int. Cl.² .............................................. G02B 5/10
[52] U.S. Cl. ......................................... 350/55; 176/1; 350/294; 350/299; 362/259
[58] Field of Search ..................... 176/1; 350/294, 299, 350/55; 362/259, 246, 298

[56] References Cited

U.S. PATENT DOCUMENTS

| | | | |
|---|---|---|---|
| 3,001,055 | 9/1961 | Lozier et al. | 350/294 |
| 3,963,328 | 6/1976 | Abel | 350/294 |
| 4,017,163 | 4/1977 | Glass | 176/1 |
| 4,084,887 | 4/1978 | Sigler | 176/1 |

Primary Examiner—Harvey E. Behrend
Attorney, Agent, or Firm—Dean E. Carlson; Frank H. Jackson; Donald P. Reynolds

[57] ABSTRACT

A pair of light beams is directed to provide illumination that is substantially uniform from all directions on a small target by a system comprising a pair of corrector windows, a pair of planar reflecting surfaces, a pair of paraboloidal mirrors and a reflecting mirror cavity. The components are arranged so that each of the beams passes through a corrector and is reflected from the planar surface to the paraboloidal mirror, from which it is focused through a hole in the planar surface to the interior of the cavity. The surface of the interior portion of the cavity is shaped to reflect the focused beam three times before the focused reflected beam strikes the target.

6 Claims, 2 Drawing Figures

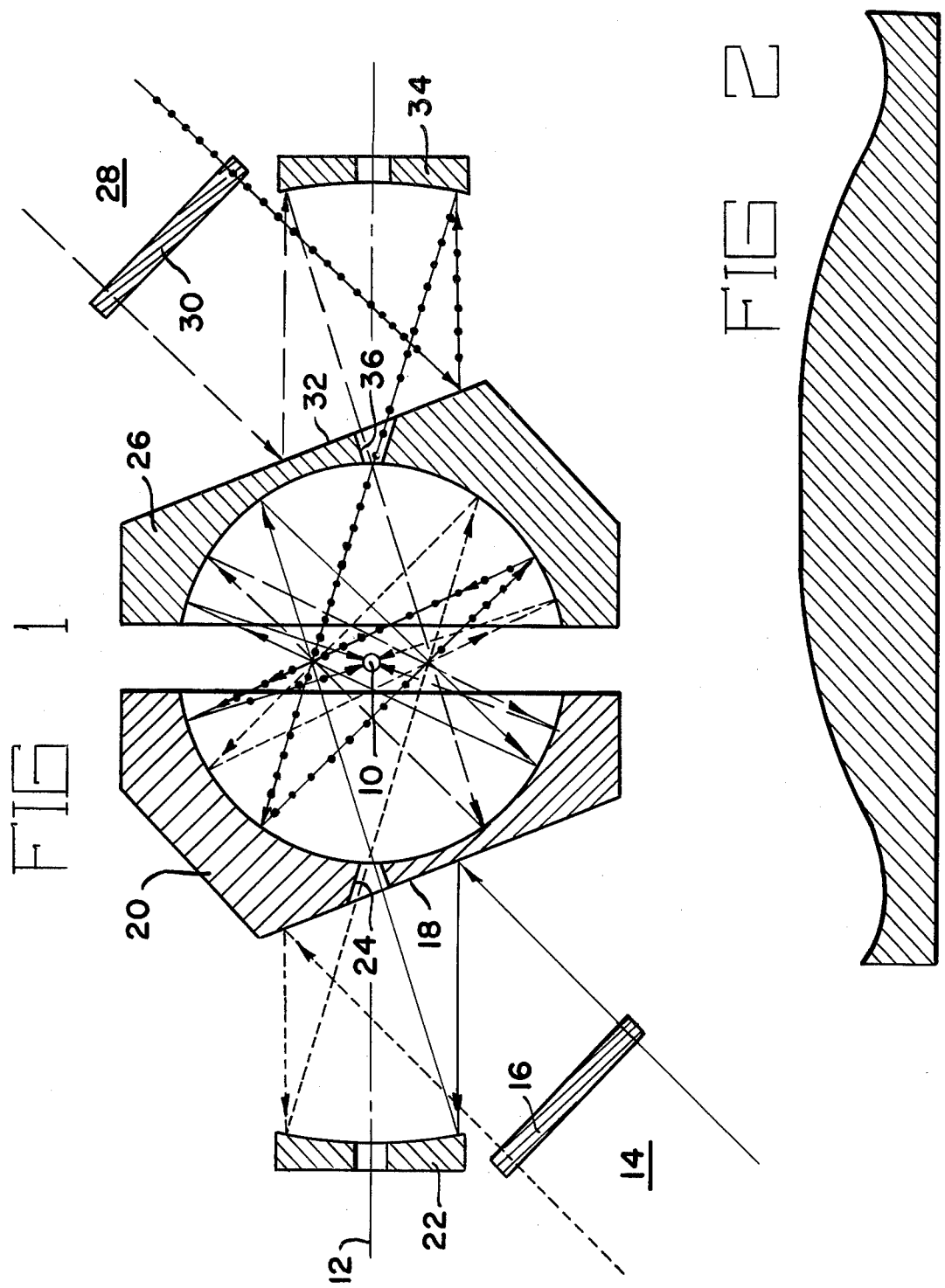

4,136,926

ACHROMATIC ILLUMINATION SYSTEM FOR SMALL TARGETS

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to the focusing of beams of light on small targets.

There are many applications in which it is desired to direct light on a relatively small target with substantial uniformity over a wide range of solid angles. An example of such a use is afforded to efforts to couple light from high-power laser beams to light a fusion reaction in a small pellet. Various approaches have been taken to meet the objectives described above. One is to use a plurality of beam splitters to split the beam into many beams and then to reflect the many beams at the target from different angles. This has the disadvantage of requiring one illumination aperture at the target for each of the split beams. Design of such a system is complicated further if it is desired to make such a system respond to a relatively wide light spectrum. Such a system is normally referred to as achromatic when it is capable of focusing light with relatively uniform focus over a range of wavelengths that exceeds 0.2 microns. In general, systems for such focus that employs a number of lenses are narrow band systems because of the difficulty of correcting refracting optical elements over a range of wavelengths.

Where the objective of the designer is to deliver light to a target as for fusion, it will usually be necessary to introduce the light through a relatively small aperture that is capable of withstanding a vacuum. This makes it desirable to have a minimum number of apertures, since each such aperture may comprise a vacuum port.

It is an object of the present invention to provide a system for delivering light to a small target over a wide range of solid angles.

It is a further object of the present invention to provide an apparatus for illuminating a small target by light admitted through a small number of apertures.

It is a further object of the present invention to provide a system that delivers light to a small target with substantial uniformity over a wide range of light frequencies.

Other objects will become apparent in the course of a detailed description of the invention.

SUMMARY OF THE INVENTION

An achromatic system for delivering light in two beams to illuminate a small target substantially uniformly comprises a corrector plate, a reflecting surface, a parabolic mirror and an aperture for the light from each beam. Light from both beams is focused by the combination of the corrector plates, the reflecting surfaces, and the parabolic mirrors through the apertures and is reflected three times from internal surfaces of a cavity in the process of being focused on the outer surface of the small target.

BRIEF DESCRIPTION OF THE DRAWINGS

FIG. 1 is a sectional view of an apparatus for the practice of the present invention.

FIG. 2 is an expanded sectional view of the corrector window of FIG. 1.

DETAILED DESCRIPTION OF THE INVENTION

FIG. 1 is a sectional view of an apparatus for the practice of the present invention. In FIG. 1, a target 10 is disposed on an axis 12. Light in a beam 14 is passed through a corrector window 16 and reflected from a surface 18 of cavity 20 and thence along axis 12 to parabolic mirror 22 which is centered on and disposed perpendicular to axis 12. From parabolic mirror 22 the beam is focused through aperture 24 to cavity 26 which together with cavity 20 forms an ellipsoidal internal reflector. The light is reflected from cavity 26 to cavity 20, again to cavity 26, thence to illuminate target 10.

A second beam 28 is passed through a corrector window 30, reflected off surface 32 to parabolic mirror 34 which is placed symmetrically about axis 12 and perpendicular to axis 12. The beam is reflected from parabolic mirror 34 through aperture 36 in cavity 26, thence from the inside of cavity 20 to the inside of cavity 26, again to the inside of cavity 20 and then on target 10. Thus light from beam 14 will eventually be reflected from cavity 26 onto one half of target 10 and light from beam 28 will eventually be reflected from cavity 20 onto the other half of target 10. Cavities 20 and 26 together form a reflecting cavity and each supports a surface 18 and 32. The combination is capable of achieving highly uniform illumination of target 10 over a solid angle that approaches $4\pi$ steradians. The illumination of a target can be achieved with variations in received power levels at the target that are no greater than 30% over the relatively wide variation of about 1 micrometer in wavelength. This range exceeds the width of the visible spectrum so that it is appropriate to refer to the illumination system as achromatic. The figures just given refer to an embodiment of the present system in which the target 10 is completely enclosed within a cavity formed by cavities 20 and 26. However, in order to support and observe target 10 under conditions of illumination, it is desirable to leave a gap between cavities 20 and 26 as shown in FIG. 1. This gap reduces the uniformity of illumination by a small amount.

The need for access to support and view a target also leads to certain other changes in the design parameters of the optics. For example, if the cavities 20 and 26 were placed to eliminate a gap, then the parabolic mirrors 22 and 34 would need to be ground to a speed of f/1.4 to provide target illumination over the complete surface. With gaps as shown in FIG. 1, target coverage over a cone angle of 150 degrees on each side is produced by paraboloidal mirrors 22 and 34 having speeds of f/1.8. Two other optical parameters are introduced to provide the uniform illumination and achromaticity. The first of these is to form the internal surfaces of cavities 20 and 26 into ellipsoidal surfaces that are figured to a conic constant of the order of −0.0224. The conic constant is defined as the negative of the square of the eccentricity. This small required value of conic constant representing surfaces that are close to spherical results in part from the fact that each beam undergoes three different bounces before striking the target. The ellipsoids are ellipsoids of revolution and also prolate spheroids.

In addition to the conic constant just described, corrector window 16 is figured to a calculated shape. That shape is indicated in FIG. 2 which is a cross-sectional representation of corrector windows 16 and 30 with a scale that is exaggerated 33 times in the axial direction. The correction windows 16 and 30 represent the only optical elements in the systems that transmit the beam. All other optical elements are reflective. In a normal operation target 10 would be placed in an enclosure at reduced pressure and it would be necessary to pass a beam 14 and a beam 28 through some form of window that would maintain a vacuum environment. In such a case, all the other optical elements, namely parabolic mirrors 22 and 34 and cavities 20 and 26, could best be disposed inside such a vacuum environment. The cross section shown in FIG. 2 is an aspheric surface quite similar to a Schmidt profile and results from the application of a standard computer analysis applying polynomial terms to the tenth order or higher.

The apparatus of the present invention is the result of a design process that met the following criteria.

1. The system exhibits bilateral symmetry to concentrate the light from two sources.

2. The target full-cone angle approaches 180° on each side, limited only by the need for an aperture to insert a target and observe the results of illuminating the target.

3. A maximum of 4% of the area of the central region of the entrance pupil may be obscured by the optics of the system.

4. Light must not strike the target on a direct path or after one or two reflections.

5. Radiation density at the surface of the target must be as uniform as possible. p 6. No element of the illumination system should be exposed to power densities greater than that found within the collimated input beam.

7. The geometric root-mean-square spot diameter at the target must be as small as possible, approaching the diffraction limit, over a spectrum encompassing the primary, doubled, and tripled frequencies of neodymium-glass and iodine lasers (wavelengths ranging from 0.355 to 1.32 micrometers).

8. The thickness of components that transmit the light must be held to a minimum.

These objectives will be considered with reference to FIGS. 1 and 2.

Bilateral symmetry is evident from FIG. 1 in which two beams 14 and 28 enter at an angle to axis 12 and are reflected and focused symmetrically about axis 12. The desirability of a full-cone angle that approaches 180° is obvious for uniform illumination and the degree to which the present invention approaches this figure will be described numerically in what follows. The only obscuration of the central region of the entrance pupil occurs as a result of the portions of beams 14 and 28 that are incident directly on apertures 24 and 36. That aperture creates a void region in the beam that is eventually focused so that no rays reflected from parabolic mirrors 22 and 34 are incident directly on target 10. The desired uniformity of irradiance of the surface of target 10 of FIG. 1 is a function of the optics including those of corrector windows 16 and 30. This also will be discussed in terms of the results achieved. The requirement that no element of the illumination system be exposed to power densities greater than those found within the collimated input beam requires only that the beam not be incident upon any transmitting or reflecting surface when it is diverged to a diameter smaller than that of the original beam. This is the case by inspection of FIG. 1 in which reflection is either planar, maintaining or decreasing illumination density, or is from a surface area greater than that of the cross section of the beams 14 and 28.

Optics of the system of FIG. 1 comprises three parts. The first is corrector windows 16 and 30 which are so described because they typically will serve as vacuum windows in addition to their optical functions. In another application they might equally as well serve only as corrector plates. Corrector windows 16 and 30 are chosen to have a minimum thickness sufficient to provide enough strength to carry the load of the vacuum and were designed by computer program to a tenth-order polynomial that produced a maximum departure from a plane of 0.421 mm in a beam having a diameter of 14 cm. The parabolic mirrors 22 and 34 were ground to f/1.8. Cavities 20 and 26 are shaped inside with a reflecting surface that is nearly but not quite hemispherical. Each is an ellipsoid with a conic constant of −0.0224. The two cavities 20 and 26 are spaced apart from each other so that the intervertex cavity mirror spacing is equal to 1.9010 times the vertex radius of curvature of the cavity mirror. Designs were optimized using both fused quartz and Schott FK-51, a trademark for a fluorphosphate glass. The fused quartz has higher transmission at 0.35 micrometers, a wavelength of particular utility, while the fluorphosphate glass has a lower nonlinear index and less chromatic dispersion over the desired band of optical wavelengths. It was possible, using either of these materials for corrector windows 16 and 30, to achieve an RMS spot diameter of 1.52 micrometers which compares favorably with diffraction-limited spot diameter of 0.76 micrometers at a wavelength of 1.06 micrometers. It is evident that the focus thus obtained will provide adequate illumination of targets of the order of 50 micrometers in diameter. Since the diffraction limit is not close to the size of such a target, it is appropriate to measure the uniformity of illumination by methods of geometrical optics. This means tracing a fan of rays of light through the system. Each ray in the fan is weighted by the area that it represents in an annulus in the entrance pupil of the system. The target surface is divided into bins and the surface intersection and bin numbers of each ray are computed. The irradiance on the target is then proportional to the total weight of the rays in each bin and the proportional illumination of each bin is the ratio of the number of rays striking that bin to the total weight. An analysis of the system of the present invention with a fan of 3000 rays and 5° bins on the target showed that the uniformity was everywhere within a factor of 2.

The embodiments of the invention in which an exclusive property or privilege is claimed are defined as follows:

1. An apparatus for focusing light from a beam of parallel rays onto a hemispherical surface comprising:
   a corrector window disposed in the beam to refract the beam;
   a planar mirror disposed to reflect the refracted beam parallel to an axis;
   a paraboloidal mirror disposed to reflect and focus the refracted beam that is reflected from the planar mirror, the paraboloidal mirror coaxial with the axis;
   a pair of cavities having ellipsoidal internal reflecting surfaces, the cavities disposed to place the foci of the ellipsoidal surfaces on the axis, one of the cavities having an aperture on the axis at the focus of the parabola to admit the focused beam from the parabola; and a target disposed on the axis midway between the foci of the ellipsoidal internal reflecting surface.

2. An apparatus for illuminating a small target substantially uniformly from a pair of parallel noncollinear beams of light, the target disposed on an axis in a plane defined by the parallel beams, the axis intersecting the parallel beams, the apparatus comprising:

a first corrector window disposed in a first beam of the pair of beams to refract the beam;

a second corrector window disposed in a second beam of the pair of beams to refract the second beam;

a first planar reflecting surface disposed to reflect the first refracted beam along the axis in a first direction;

a second planar reflecting surface disposed to reflect the second refracted beam along the axis in a second direction opposite to the first direction;

a first paraboloidal mirror having a mirror axis coincident with the axis and receiving the reflected first refracted beam to produce a first focused beam directed along the axis;

a second paraboloidal mirror having a mirror axis coincident with the axis and receiving the reflected second refracted beam to produce a second focused beam directed along the axis in a direction toward the first paraboloidal mirror and opposite to the direction of the first focused beam;

a first cavity having an ellipsoidol internal reflecting surface with an ellipsoidal axis coincident with the axis and an aperture on the axis disposed at a point of focus of the first focused beam, a vertex of the ellipsoid on the axis and at a small distance from the target;

a second cavity having an ellipsoidal internal reflecting surface with an ellipsoidal axis coincident with the axis and an aperture on the axis disposed at a point of focus of the second focused beam, the ellipsoidal surface congruent to the ellipsoidal reflecting surface of the first cavity, a vertex of the ellipsoid of the second cavity on the axis at a small distance from the target equal to the distance of the vertex of the ellipsoid of the first cavity and opposite thereto so that the target is midway between the vertices, the distances of the vertices from the target chosen to accomplish reflection of a ray entering either of the apertures alternately from opposite ellipsoidal surfaces for three times before striking the target.

3. The apparatus of claim 1 wherein the diameter of the beam is about 14 cm.

4. The apparatus of claim 1 wherein the paraboloidal mirrors are f/1.8.

5. The apparatus of claim 1 wherein the ellipsoidal reflecting surfaces have a conic constant of $-0.0224$.

6. The apparatus of claim 1 wherein the correcting windows are quartz figured to a tenth-order aspheric correction.

* * * * *